June 10, 1958
L. PAVELLE
2,837,988
APPARATUS FOR AUTOMATICALLY PROCESSING A
SENSITIZED FILM IN SUCCESSIVE STEPS
Filed Aug. 2, 1954
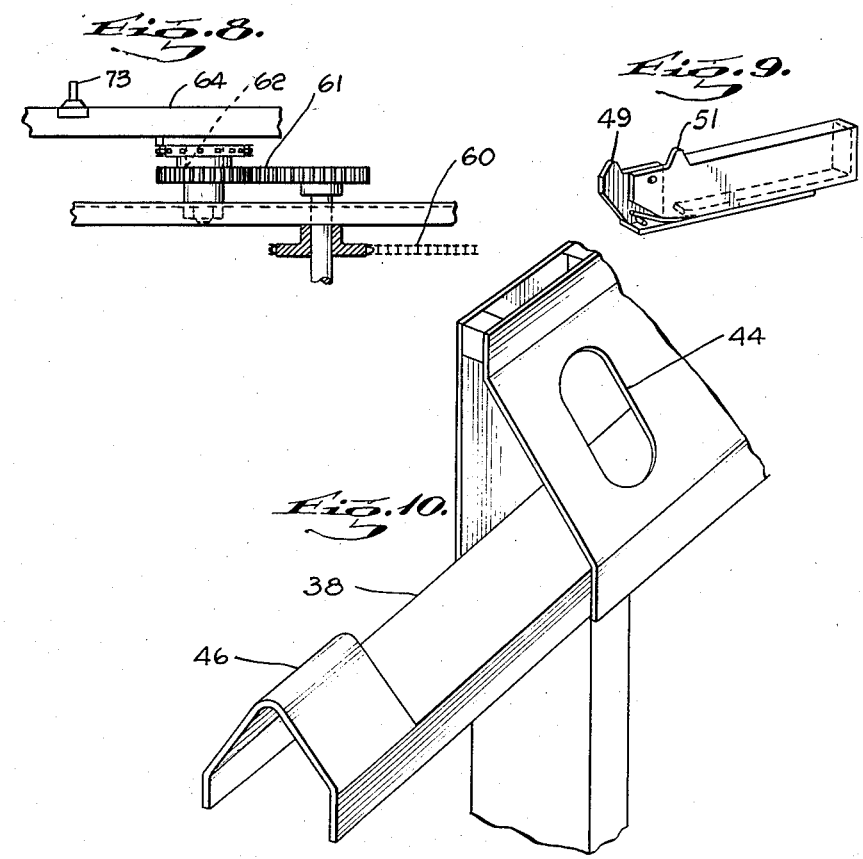
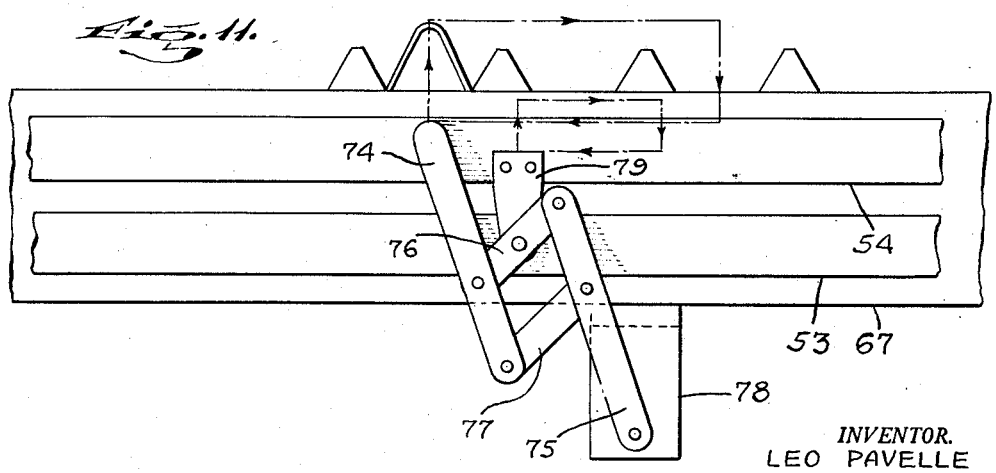
INVENTOR.
LEO PAVELLE
BY John E. Hubbell
ATTORNEY

United States Patent Office 2,837,988
Patented June 10, 1958

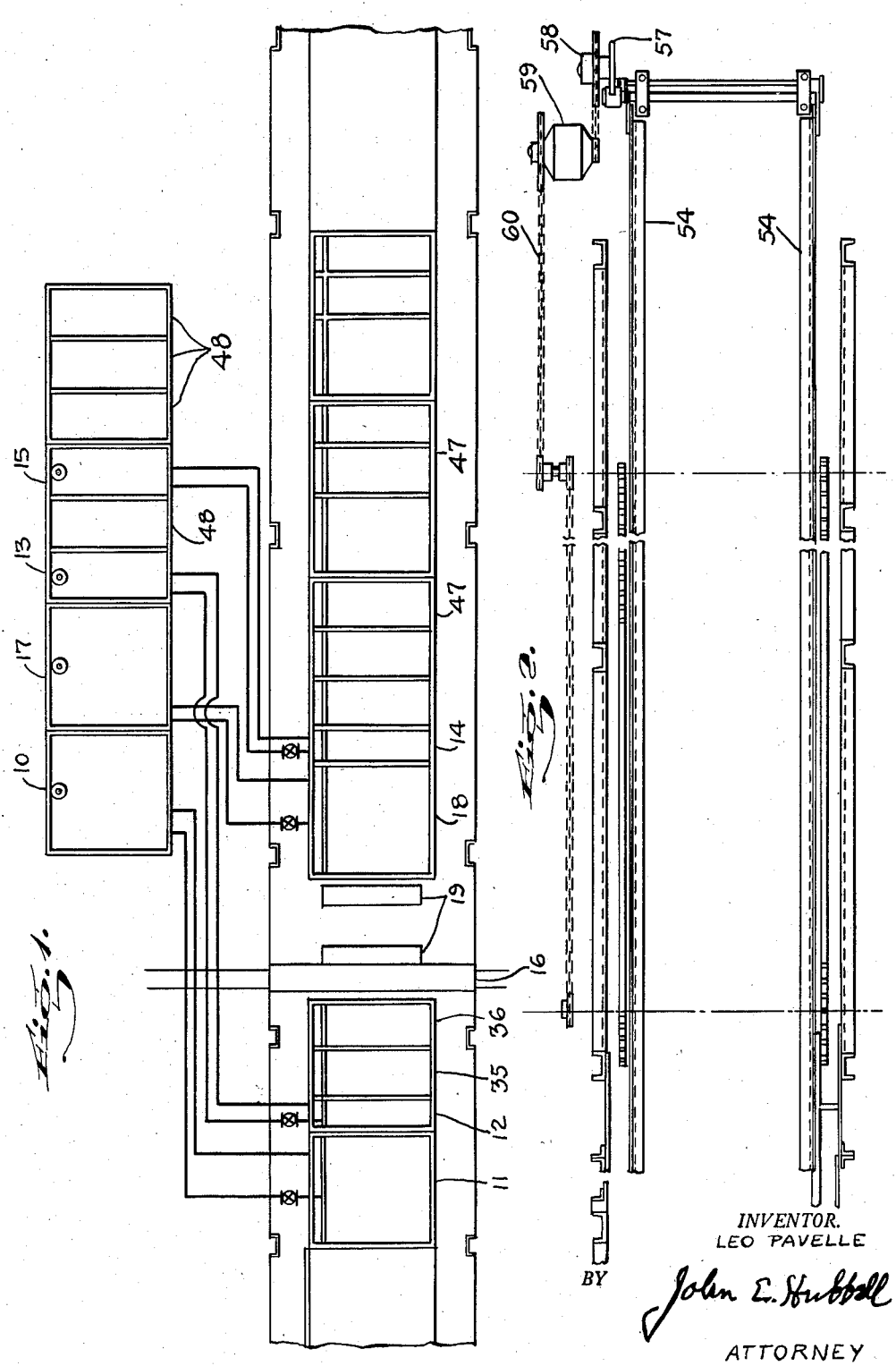

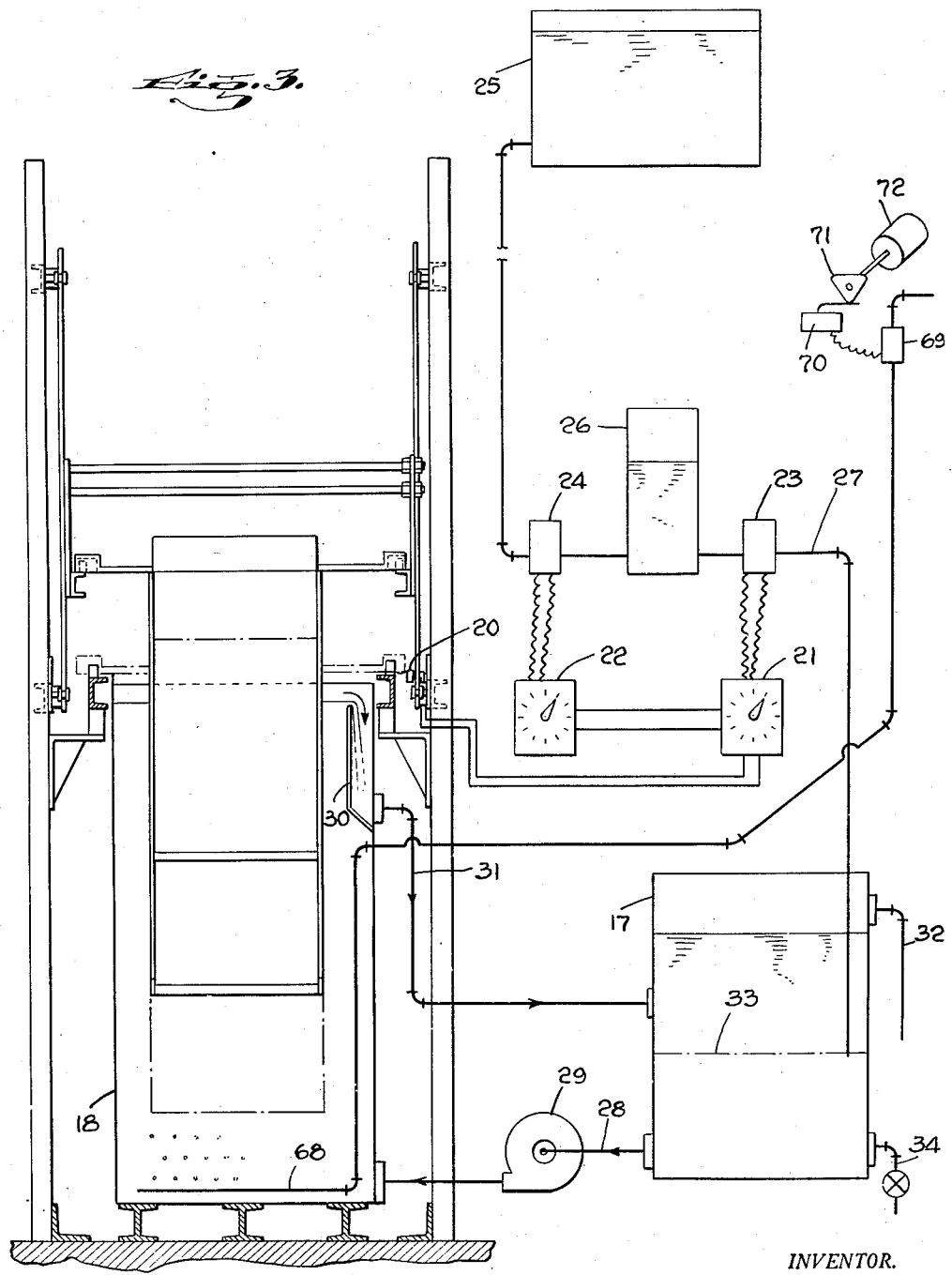

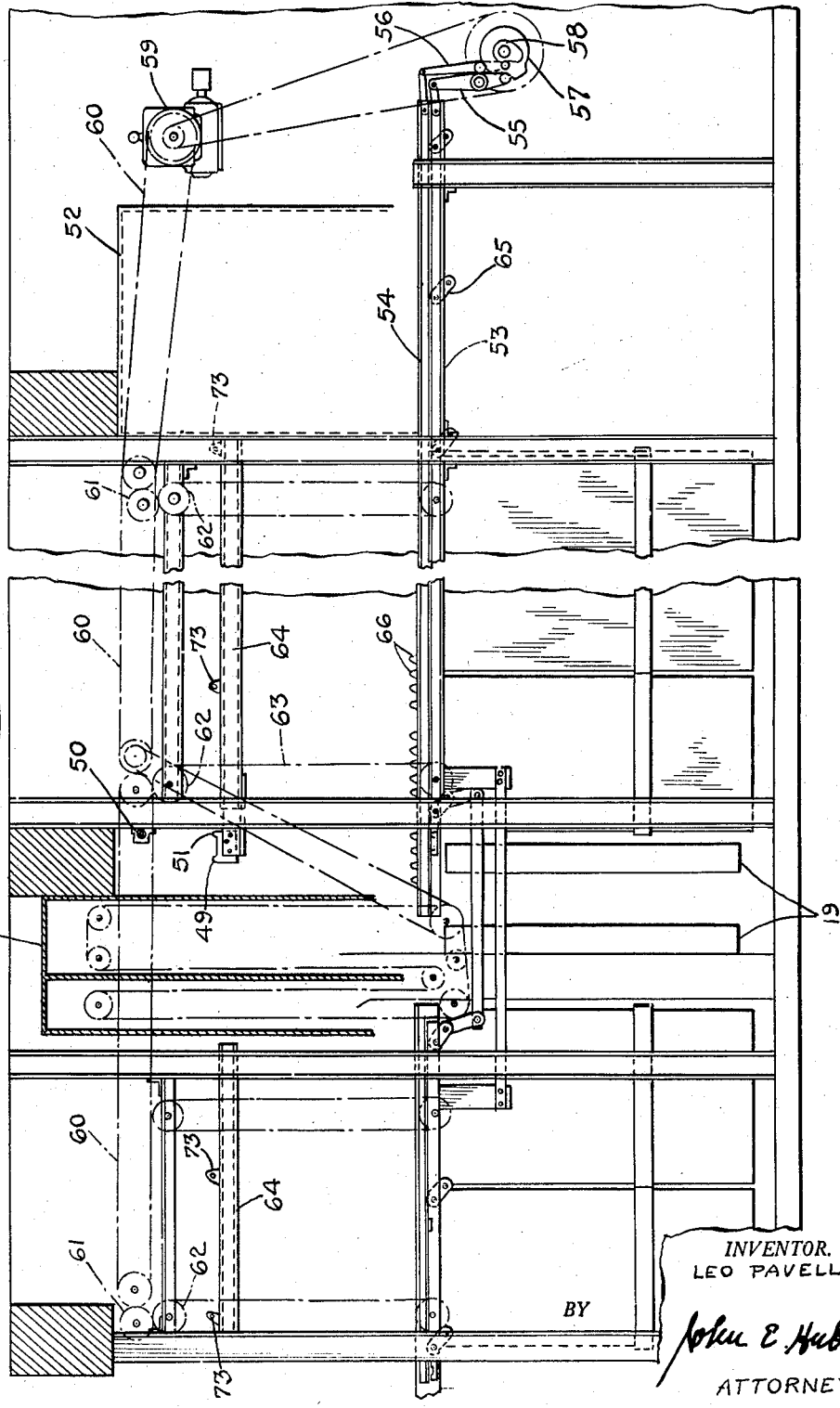

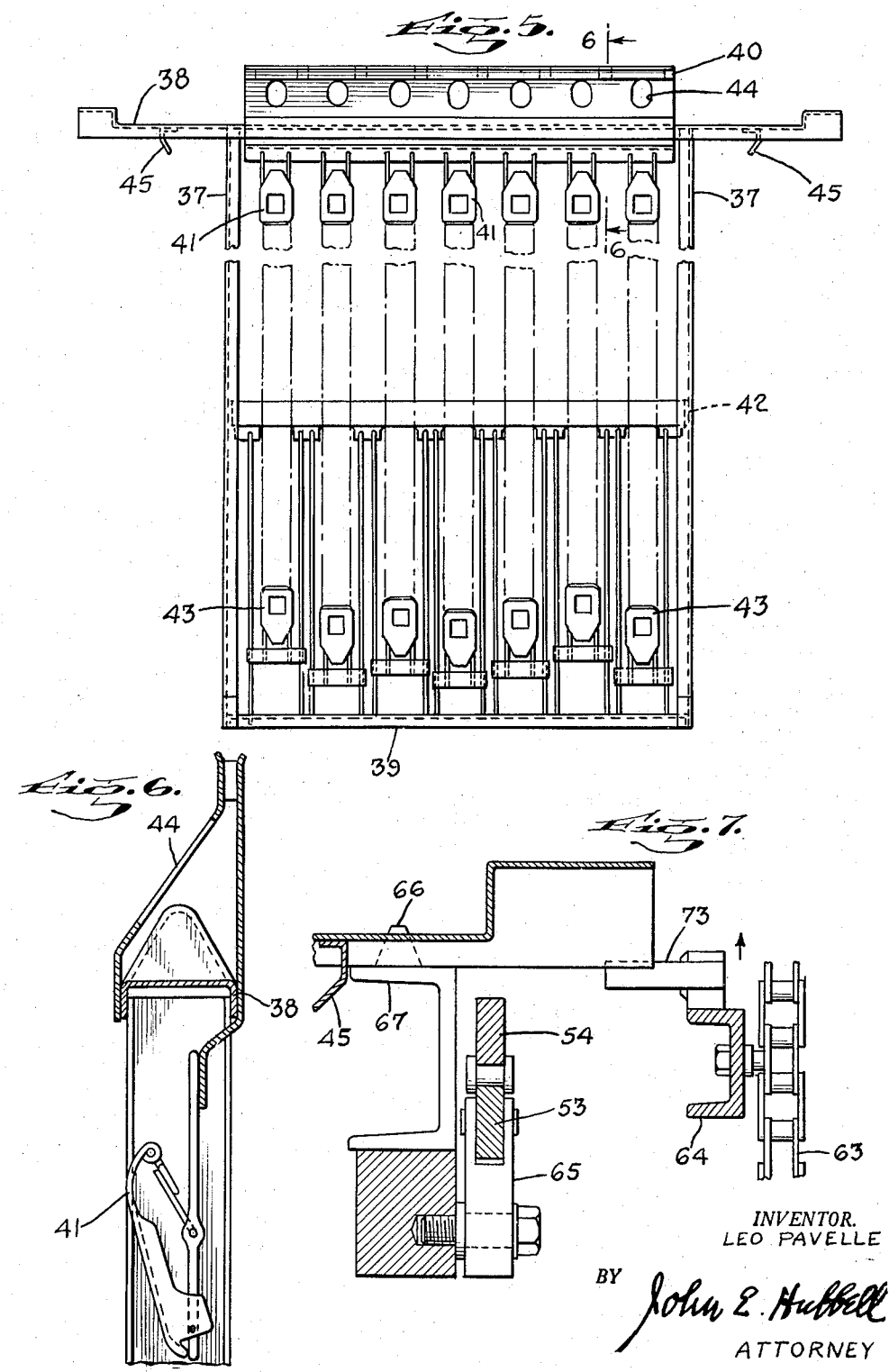

2,837,988

APPARATUS FOR AUTOMATICALLY PROCESSING A SENSITIZED FILM IN SUCCESSIVE STEPS

Leo Pavelle, Mount Vernon, N. Y., assignor, by mesne assignments, to Technicolor New York Corporation, a corporation of Delaware Application August 2, 1954, Serial No. 447,193

5 Claims. (Cl. 95—89)

This invention relates to a machine for automatically processing a sensitized film progressively through a series of tanks wherein the several steps of the process take place.

It is a principal object of this invention to provide an apparatus for the automatic treating of sensitized film.

It is also an object of this invention to provide a rack that will hold exposed film during processing.

It is another object of this invention to provide improved means for transferring the rack with the film through each tank automatically and to convey the rack from tank to tank.

It is a still further object of the invention to automatically time the treatment of the film in each step of the process.

Still another object of this invention is to maintain the strength of the chemical solution in each of the treating tanks automatically in accordance with the number of films that are to be treated in the process.

For a better understanding of this invention refer to the attached drawings, in which:

Figure 1 is a plan view of the tank arrangement;

Fig. 2 is a plan view of the transfer mechanism;

Fig. 3 is an end view of one tank showing the automatic replenishing system.

Fig. 4 is a side view of the tank showing the transfer mechanism;

Fig. 5 is a side view of the film rack;

Fig. 6 is a section on line 6—6 of Fig. 5;

Fig. 7 is an end view partially in section, showing the positioning of the rack end support on the rack resting channel, and the lift pins.

Fig. 8 is a plan view showing the drive of the transfer mechanism.

Fig. 9 is a plan view of the end of the pick-up bar.

Fig. 10 is an end view of the film rack support.

Fig. 11 is a side view of a double advance attachment.

In the drawings and throughout the specification similar reference characters refer to the same or similar parts.

This invention comprises a series of treating tanks in side by side arrangement through which are automatically passed racks holding sensitized film to be treated in these tanks. Supplementing these tanks is a set of surge tanks connected thereto, the said surge tanks receiving the overflow from the treating tanks and returning to the treating tanks the treating solution necessary in the development and fixing of sensitized film. The make-up chemical, necessary to maintain the treating baths at the proper strength, is automatically added to the surge tanks. The solutions in these treating tanks are circulated to maintain the solutions in uniform strength throughout. The racks are automatically moved through all of the tanks at a constant rate and the treating tanks are of such a length that the time in each tank gives the correct treatment to the film by the chemical solution contained in that tank. The racks are then automatically removed from a given tank and introduced into the next succeeding tank.

Figure 1 shows the treating tanks 11, 12 etc. connected by the necessary conduit to the surge tanks 10, 17, 13, 15 etc. The timing and moving mechanism for the racks holding the film is shown Figure 2.

The rack

The rack shown in Figures 5 and 6 has a frame 37, 37, depending from the head bar 38, joined at the bottom by means of the cross bar 39. Attached to the head bar is a roll film holding rack 40. Suspended from the lower part of this head bar are a series of clamps 41. Rising from the cross bar 39 and connected to a cross piece 42, about half-way up the rack, are a series of wire spokes having weighted clamps 43 slidably attached thereto. The films are placed in the openings 44 in the film holding rack before the rack is taken into the dark room, with the necessary identification tags placed in openings provided.

Figure 6 is a section on line 6—6 of Figure 5 and shows the clamp 41 attached to the head bar 38; the opening 44 used to receive the film, is also shown in this view.

The film is stripped in the dark room from the film spool and attached between the clamps 41 and 43 in such a manner as to hold the film under the tension of the weight attached to the clamp 43. The head bar has an extension on each side thereof to contact the rack resting channel 67 having centering pins 66. The channel is on the edge of the tank and has the moving mechanism associated therewith.

On each side of this head bar 38 are two centering fingers 45, 45, shown in Figures 5 and 7. These hold the rack in its proper location transversely of the tank. The ends of the head bar 38 are made with a tapered female guide to provide longitudinal centering with respect to the lifting pins on the lift channels. This tapered female guide centers the rack longitudinally in the tank and contacts the necessary advancing mechanism hereinafter described.

The automatic replenishing system

The treating tanks shown as 11, 12, etc in Figure 1 and their associated surge tanks 10, 13, 15, 17 etc. are arranged in side by side arrangement. The treating tanks are arranged in one bank and the surge tanks are separated therefrom and connected thereto by the necessary conduits.

Referring to Figure 3, the treating tank 18 is representative of each of these treating tanks and has an overflow trough 30 in the side thereof, and a conduit 31 leading to the surge tank 17. The conduit 28 and the pump 29 return the contents of the surge tank 17 to the base of the treating tank 18. The surge tank 17 has an overflow pipe 32 near the top thereof to remove excess liquid therefrom, and a drain pipe 34 near the bottom. The automatic replenishing system is activated by the rack striking the initiator switch 20 as the rack enters the first tank after the light lock 16. The initiator switch operates the timing switches 21 and 22 and in turn each timing switch operates the solenoid valves 23 and 24. These valves control the flow of the make-up chemical from the tank 25, maintained at sufficient head to cause the flow from the tank through the sight gauge 26 and into the surge tank in the following sequence. When the switch 20 is activated it operates the timer 21 which opens the valve 23 and allows the liquid normally maintained in the sight gauge 26 to flow through the conduit 27 into the surge tank 17 and then closes this solenoid valve. The timer 22 then operates to open the solenoid valve 24 and refill the sight gauge to a predetermined liquid level. The chemical solution is recirculated by means of the conduit 28 and the pump 29, into the bottom of the treating tank 18, circulating through this tank and out of the weir at the top of the tank, into the overflow trough 30, through the conduit 31, and back into the surge tank 17.

The liquid level at the beginning of the day's run is shown at 33 and gradually accumulates by the addition of new chemical solutions to maintain the chemical strength of the treating solution in tank 18 automatically in accordance with the number of film racks entering tank 18, but cannot overflow due to the waste overflow conduit 32 leading into a discharge pipe (not shown).

Where this is shown on tank 18 in Figures 1 and 3, a similar system is applied to tanks 11, 12, 14, etc. which are fed from the surge tanks 10, 13, 15, 17, etc. of the surge tanks operating through the same initiating switch 20, each tank having two timers and two solenoids connected to their individual sight gauges, similar to that shown in Figure 3, as 21, 22, 23 and 24 for tank 17.

The wash tanks are connected by means of a weir and an overflow trough to a waste trough and a drain (not shown), but of course do not have any chemical admitted thereto. These tanks are shown in Figure 1 as 47. The necessary conduits are also included but not shown.

The drive mechanism

The film mounted in the rack is placed on the rack resting channel 67 and is spaced by the centering pins 66. It is subsequently lifted and advanced by the rack lift bars 53 and advance bars 54 to such a position, where it is picked up by a pin 73 on the transfer channel 64, shown in Figure 4, which lifts it into the tank 11. It is then advanced through the tank 11 by the rack lift bars 53 and the advance bars 54 until it reaches the last position in tank 11, whereupon it is again lifted by the pin 73 on the transfer channel 64 and transferred into tank 12 and progresses through tanks 35, 36 in like manner. At the end of tank 35 it is lifted by a closed loop chain, where it is transferred through the light lock 16 shown in Fig. 4 and lowered into a position between the re-exposer lamp 19 and rested on the end of the rack rest channel shown in Figure 4. It is then raised by the transfer channels 64 which have special adaptors shown in Figs. 4 and 10 on the ends thereof and is hung in a raised position on pin 50 shown in Figure 4. On the next cycle of the transfer channels 64 the pin 51 picks the rack off of the pin 50 and lowers it into tank 18. The rack is then successively advanced through the various chemical treating baths, and washing baths, as required in the process until it reaches the last tank shown in Fig. 1. It is then raised from this tank and advanced into the drier 52, shown in Figure 4. The racks are lifted and advanced until they reach the last position in the drier and are then deposited on an unloading platform. The films are then removed from the rack manually and have attached thereto the identification tag retained in the opening 44 in the head of the rack. All of the operations between the loading of the film in the rack and the removal of the developed, exposed, treated, washed, dried film are automatically controlled by the machine.

The racks are advanced by means of the lift bars 53 and the advance bars 54, shown in Figure 4. These bars in turn are moved by the levers 55 and 56 which are actuated by the cams 57 and 58 which are in turn driven by the speed reducer 59 and the motor (not shown). This same speed reducer operates through drive 60, operating the length of the machine which drives a series of idlers 61 and the sprockets 62, shown in Figure 8. These in turns operate the chains 63 which drive the lift channels 64.

In the operation of this machine the racks are moved forwardly in the individual tanks through the lift bar 53 and the advance bar 54 actuated by the cams 57 and 58. As the cams 57 and 58 rotate the rise of the cam 57 encounters the follower of lever 55 pulling the lift bar 53 towards the rear of the machine.

The lift bar will rise as it is pulled toward the rear of the machine, because it is pivoted to the framework of the machine through the levers 65. Since the advance bar 54 rests on rollers (shown in Fig. 7) which in turn are in rolling contact with the lift bar 53, only the vertical components of the motion of the lift bar 53 will be transferred to the advance bar 54. Thus the racks in the entire machine will be lifted sufficiently high to clear the centering pins 66. The follower of the lever 55 now rests upon the radial land of cam 57. At this point the follower of lever 56 encounters the rise of cam 58. As the lever 56 pivots it pulls forward on the advance bars 54 and advances equally to the spacing between the centering pins 66 on the rack resting channel 67, and thus each rack in the machine is advanced one position. At this point the lever 56 encounters a radial land of cam 58. The follower on lever 55 encounters the fall position of cam 57 which allows the lifting bar to return to its original position, thus lowering the racks into their new position in the tanks. The follower on lever 56 encounters the fall position of cam 58 and the advance bar is allowed to return to its original position, ready for a new advance cycle. The relative motion of the lift bars 53 and the advance bars 54 results in imparting a square feed motion to the advance bar 54, and thus in turn to the rack. The length of time that the rack is in one tank, as specified by the process, is governed by the number of positions provided in each tank.

The whole lift and advance cycle takes place substantially within one-half revolution of the shaft driven cams 57 and 58. Therefore somewhat more than one-half revolution of the shaft driving these cams is available for the transfer cycle. For instance if one revolution of the shaft required 100 seconds, somewhat more than 50 seconds would be provided for the transfer of the rack from one tank into the next. This is accomplished by driving the lift channels 64 through their respective drive arrangement to complete one cycle in 50 seconds. Therefore, there are exactly two cycles of the lift channel 64 for each complete cycle of the entire machine. Whereas, the advance mechanism and the transfer mechanism have been described for the one side of the machine an identical mechanism operated in unison therewith is placed on the other side of the machine with the treating tanks in between.

A special lifting adaptor, shown in Figure 9, is used to remove the rack from the re-exposure chamber and place it into the first position of the first tank in the light room. The rack is lifted from this position of rest in the re-exposure chamber by the arm 49 being inserted into the female tapered guide 46 at the end of the rack. It is deposited at approximately the highest point of its travel on to the pin 50, as shown in Figure 4, and is suspended there until the lift channel 64 returns to its upper position on its off-cycle, that is to say, the cycle during which no racks are being lifted. At this point, the lifter pin 51 removes the rack from the pin 50 and deposits it into the first position of the first tank in the light room. As this rack will remain in this position during the subsequent active cycle of the lift channel, it is necessary that the lifter arm 49 be pivoted so that it can be deflected upwardly as the lift bar passes the rack, which has not yet moved out of the first position in the first tank.

In case it is desired to shorten the treating time in any single tank a double advance attachment is placed between the rack rest channel and the advance bar (Fig. 11). This attachment consists of a linkage 74 and 75 connected by the cross links 76, 77, the link 75 being pivotally mounted on the rack rest channel by means of the bracket 78, and the link 76 is pivoted at its center to the advance bar by means of bracket 79. When the machine is in operation the rack resting channel remains stationary and the advance bar rises as described above.

The two pivots move apart. This linkage arrangement causes the link 74 to rise and engage the tapered female guide provided at the end of the rack and raises the rack so that it advances double the distance that it would normally advance and therefore shorten the length of time that the rack in in the tank by a corresponding amount.

The agitating system

The agitating system comprises a perforated tube 68, Figure 3, placed in the bottom of each tank and periodically a burst of gas is admitted to this tube. This intermittent burst of gas is controlled by a solenoid valve 69 which is operated by a switch 70 which is in turn activated by a cam 71 driven by a small constant speed motor, 72. In all of the tanks where oxygen does not affect the chemical composition of the treating solution compressed air is used as the agitating medium supply from a tank of compressed air. In those tanks where oxygen does affect the chemical composition of the treating solution, compressed nitrogen is used as the agitating gas supply from a tank of compressed nitrogen.

While in accordance with the provisions of the patent statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

What is claimed is:

1. A photographic developing machine comprising a plurality of tanks for treating solutions, each tank being of a length proportional to the desired treating time the film remains in said solution, a plurality of racks for holding sensitized photographic film, each rack comprising a frame, the top member of said frame having female tapered guides at the ends thereof and transverse centering pins thereunder, two cooperating mechanisms one on each side of said tanks, for moving said racks stepwise the length of said tanks at a constant rate, said mechanisms each including an advance bar adapted to move in a rectangular path to advance said racks in said tanks and further including a first link pivotally attached to the advance bar, a second link pivotally attached to the tank, said links being interconnected by a third link, said first link being of such length that it will contact the female tapered guide on the film holding rack and advance the same double the normal advance distance, means for lifting the racks from one tank and placing them in the next succeeding tank, and automatic means for replenishing the reactive chemical in each tank.

2. A photographic developing machine comprising a plurality of tanks for treating solutions, each tank being of a length proportional to the desired treating time the film remains in said solution, a rack for holding sensitized photographic film, said rack comprising a frame having a top member provided with female tapered guides at the ends thereof and transverse centering pins thereunder, means for moving said rack stepwise the length of said tanks at a constant rate, said means including an advance bar adapted to move in a rectangular path to advance said rack in said tanks, a first link pivotally mounted on said advance bar, a second link mounted on a pivot fixed relative to said tanks and a third link interconnecting said first and second links, said first link being of such length that it will contact the female tapered guide on the film holding rack and advance the same double the normal advance distance, and means for lifting the rack from one tank and placing it in the next succeeding tank.

3. A photographic developing machine comprising a plurality of tanks for treating solutions, each tank being of a length proportional to the desired treating time the film remains in said solution, a rack for holding sensitized photographic film, said rack comprising a frame having a top member provided with female tapered guides at the ends thereof and transverse centering pins thereunder, means for moving said rack stepwise the length of said tanks at a constant rate, said means including an advance bar adapted to move in a rectangular path to advance said rack in said tanks, a first link pivotally mounted on said advance bar, a second link mounted on a pivot fixed relative to said tanks and a third link interconnecting said first and second links, said first link being of such length that it will contact the female tapered guide on the film holding rack and advance the same a multiple of the normal advance distance, and means for lifting the rack from one tank and placing it in the next succeeding tank.

4. A photographic developing machine comprising a plurality of tanks for treating solutions, each tank being of a length proportional to the desired treating time the film remains in said solution, a rack for holding sensitized photographic film, means for moving said rack stepwise the length of said tanks at a constant rate, said means including an advance bar for advancing said rack in said tanks, a first link pivotally mounted on said advance bar, a second link mounted on a pivot fixed relative to said tanks and a third link interconnecting said first and second links, said first link being of such length that it will contact the female tapered guide on the film holding rack and advance the same double the normal advance distance, and means for lifting the rack from one tank and placing it in the next succeeding tank.

5. A photographic developing machine comprising a plurality of tanks for treating solutions, each tank being of a length proportional to the desired treating time the film remains in said solution, a rack for holding sensitized photographic film, means for moving said rack stepwise the length of said tanks at a constant rate, said means including an advance bar for advancing said rack in said tanks, a first link pivotally mounted on said advance bar, a second link mounted on a pivot fixed relative to said tanks and a third link interconnecting said first and second links, said first link being of such length that it will contact the female tapered guide on the film holding rack and advance the same a multiple of the normal advance distance, and means for lifting the rack from one tank and placing it in the next succeeding tank.

References Cited in the file of this patent
UNITED STATES PATENTS

| Re. 18,991 | Williams | Nov. 7, 1933 |
| 1,061,667 | Gerhard | May 13, 1913 |
| 1,670,673 | Williams | May 22, 1928 |
| 1,863,689 | Dye | June 21, 1932 |
| 1,903,151 | Wakeman | Mar. 28, 1933 |
| 1,932,946 | Wolf | Oct. 31, 1933 |
| 1,955,575 | Buck | Apr. 17, 1934 |
| 1,982,370 | Carpenter | Nov. 27, 1934 |
| 2,088,278 | Pappajion | July 27, 1937 |
| 2,096,015 | Von Meister et al. | Oct. 19, 1937 |
| 2,194,345 | Winans | Mar. 19, 1940 |
| 2,518,034 | Ludwig | Aug. 8, 1950 |
| 2,545,031 | Izzi | Mar. 13, 1951 |
| 2,626,627 | Jung et al. | Jan. 27, 1953 |
| 2,675,820 | Harrison | Apr. 20, 1954 |
| 2,734,436 | Hills | Feb. 14, 1956 |